(No Model.)

R. BENEDICT.
COLLAR OR CUFF BUTTON OR STUD.

No. 347,555. Patented Aug. 17, 1886.

WITNESSES:
John H. Deemer
C. Sedgwick

INVENTOR:
R. Benedict
BY Munn & Co
ATTORNEYS.

UNITED STATES PATENT OFFICE.

READ BENEDICT, OF WEST NEW BRIGHTON, NEW YORK.

COLLAR OR CUFF BUTTON OR STUD.

SPECIFICATION forming part of Letters Patent No. 347,555, dated August 17, 1886.

Application filed March 11, 1886. Serial No. 194,844. (No model.)

*To all whom it may concern:*

Be it known that I, READ BENEDICT, of West New Brighton, in the county of Richmond and State of New York, have invented a new and Improved Collar or Cuff Button or Stud, of which the following is a full, clear, and exact description.

My invention relates to a cuff or collar button or stud designed to facilitate its insertion into and its removal from the button-hole; and the invention consists, principally, of a button having a shank formed with outwardly-inclined sides or edges near the head of the button to spread the button-hole, so the head of the button may be easily slipped out of the button-hole.

The invention also consists in making the shank flat upon two sides to permit the button-hole to close under the head of the button, when the same is turned to bring the flat surfaces of the shank parallel with the edges of the button-hole.

The invention further consists in curving or beveling the lower surfaces of the head of the button from the flat surfaces of the shank upward to facilitate passage of the head out of the button-hole; and the invention finally consists in making the head of the button oval or egg-shaped, and in affixing it to the shank with its shortest diameter in line with the width of the shank.

Reference is to be had to the accompanying drawings, forming a part of this specification, in which similar letters of reference indicate corresponding parts in all the figures.

Figure 1:
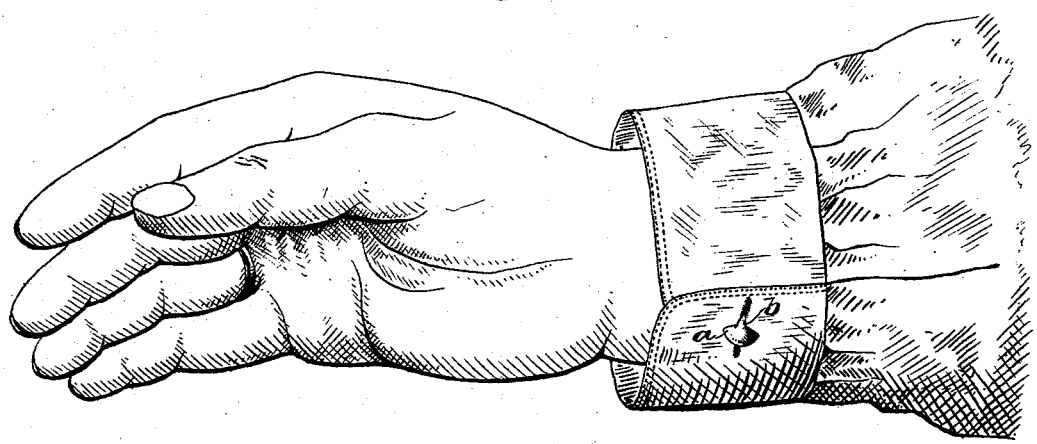
Figure 2:
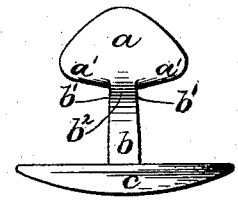
Figure 3:
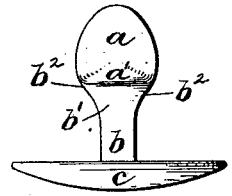
Figure 4:
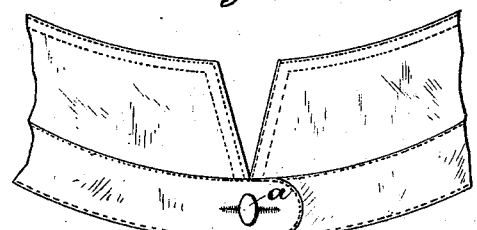

Figure 1 shows my new and improved cuff or collar button or stud applied to a shirt-sleeve. Figs. 2 and 3 are reverse enlarged views of the button, and Fig. 4 shows the button applied to a collar.

$a$ represents the head, $b$ the shank, and $c$ the bottom or plate, of the button, which latter is attached to the shank $b$ in the usual manner. The shank $b$ is made flat at two of its sides, $b'$, and is formed with the inclined edges $b^2$, which serve to spread the button-hole when the shank is turned to occupy a transverse position to the button-hole, so the inclined or curved edges $b^2$ will facilitate the passage of the head $a$ out of the button-hole. The head $a$ contiguous to the flat surfaces $b'$ of the shank is beveled or slanted upward and outward, as shown at $a'\ a'$, which facilitates the turning of the button in the button hole, and also its passage out of the button-hole, and the head $a$, by preference, is made oval, egg-shaped, or prolate-speroidal in form, and it is affixed to or formed on the shank so the greatest width of the shank is in line with the shortest diameter of the head.

Constructed in this manner the head of the button can be easily inserted in the button-hole, owing to its conical shape, and when inserted the action of the sides of the button-hole on the curved edges, $b^2$, will turn the button so the flat surfaces $b'$ will stand in line with the length of the button-hole, as shown in Fig. 1, thus bringing the head $a$ crosswise of the button-hole. To remove the button it has simply to be given a one-quarter turn, which will cause the widened portion of the shank near the head to spread the button-hole, and the curved edges $b'$ being flush or nearly so or in about the same curve with the sides of the head the head may be easily slipped through the button-hole and thus easily removed.

Having thus described my invention, what I claim as new, and desire to secure by Letters Patent, is—

The head $a$, formed with the beveled lower surfaces, $a'\ a'$, in combination with the plate $c$ and the shank $b$, formed with the flat surfaces $b'$ and curved edges $b^2$, substantially as described.

READ BENEDICT.

Witnesses:
H. A. WEST,
C. SEDGWICK.